United States Patent Office 3,002,959
Patented Oct. 3, 1961

3,002,959
HYDROXYL-CONTAINING COPOLYMERS
AND THEIR PREPARATION
Darrell D. Hicks, Louisville, Ky., assignor to Devoe & Raynolds Co., Inc., a corporation of New York
No Drawing. Filed June 25, 1956, Ser. No. 593,340
5 Claims. (Cl. 260—88.1)

This invention pertains to resinous polymers useful in the coating industry and to methods for their preparation. More particularly, this invention relates to a class of polyhydroxy copolymers eminently suitable as cross-linking agents with diisocyanates, epoxides and urea-aldehyde resins.

The polyhydroxy copolymers of this invention are esters of a copolymer of a short chain alpha-beta unsaturated monocarboxylic acid and a vinyl monomer having a single active terminal vinyl group, wherein the ester substituents are formed by means of a monoepoxide. The reactions involved in the preparation of these polyhydroxy copolymers are the carboxy-epoxy reactions between the carboxyl group of the alpha-beta unsaturated acid and the monoepoxide, whereby the hydroxy ester is formed, and the copolymerization reaction wherein the unsaturated monocarboxylic acid, or its ester, and the vinyl monomer copolymerize to form the copolymer.

In the reaction of a carboxyl group with an epoxide group, two monohydroxy ester substituents are possible. Each portion of the ester substituent derived from the monoepoxide, that is, the alcoholic portion of the ester substituent, contains one alcoholic hydroxyl group on a carbon atom either alpha or beta to a carbonyl carbon atom. Hence, in the copolymers resulting from the process of this invention each hydroxyl in the molecule is attached to a carbon atom linked to a carbonyl group through the oxygen atom or to a carbon atom adjacent to a carbon atom linked to a carbonyl group through the oxygen atom of the ester linkage.

In preparing the copolymers of this invention one method is to esterify the alpha-beta unsaturated monocarboxylic acid to form the hydroxy-ester and then to copolymerize this resulting hydroxy-ester with the vinyl monomer. Another method is to copolymerize the alpha-beta unsaturated monocarboxylic acid with the vinyl monomer and then to esterify the copolymer thus formed using a monoepoxide to form the polyhydroxy copolymer.

In accordance with this invention, however, it has been discovered that the hydroxy-ester and the copolymer can be made by concomitant reactions, through the combination of the three reactants and the use of two catalysts, a carboxy-epoxy catalyst and a vinyl polymerization catalyst. Thus, by the use of two catalysts, a hydroxy-containing copolymer is prepared by copolymerizing an alpha-beta unsaturated monocarboxylic acid with a monovinyl compound while concomitantly the alpha-beta unsaturated acid is reacted with a monoepoxide to form a hydroxy-ester. More specifically, a styrene-hydroxy propyl acrylate or vinyl toluene-hydroxy propyl methacrylate copolymer is prepared by combining acrylic acid or methacrylic acid, propylene oxide, and styrene or vinyl toluene, and the esterified copolymer containing hydroxyl groups is readily formed in the presence of both an amine, an amine salt of quaternary ammonium hydroxide, etc. as a catalyst for the carboxy-epoxy reaction and a peroxide or hydroperoxide, etc. as a catalyst for the copolymerization reaction.

In preparing the polyhydroxy copolymers following the practice of this invention, the three reactants and the two catalysts are combined in the presence of a solvent which is inert insofar as the reactions are concerned, and refluxed until the carboxy-epoxy esterification and concomitant polymerization reactions are substantially complete, as indicated by a low acid value, and a solids content approaching the theoretical for complete conversion. The reflux period generally is from four to ten hours. The reflux temperature is dependent upon the boiling point of the lowest boiling substituent, and the amount of the substituent present in the mixture. Thus, when propylene oxide, along with a higher boiling solvent, is used the reflux temperature is generally 75° C. to 90° C. In general, the reaction temperature is between 60° C. and the reflux temperature of the mixture. It is noted this this invention involves the use of two catalysts, where one catalyst is an inhibitor of the reaction promoted by the other. Amines, for example, are inhibitors of vinyl copolymerization reactions. Accordingly, for maximum production of ester groups, as well as ultimate conversion to copolymer, it is desirable that the two catalysts be in balance. If too much amine or similar catalyst is used the acid value will be satisfactory but the conversion to copolymer will be low. If too much peroxide or other polymerization catalyst is employed, conversion to polymer is satisfactory but the acid value, indicating extent of esterification of carboxyl groups, will be higher. In general, the amount of peroxide is one to four percent, depending upon the monomers and the carboxy-epoxy catalyst is in the range of 0.5 to six percent by weight based on the reactants, depending upon its basicity. Weakly basic catalysts such as tertiary amines are used in quantities of from three to four to six percent, while less of the stronger bases such as primary amine is used within the range.

In the preparation of the polyhydroxy copolymers of this invention for maximum yields it is also desirable to maintain a proper proportion of reactants to solvent. When too much solvent is used, the carboxy-epoxy reaction proceeds normally but there is a low conversion to polymer. If too little solvent is employed production of ester groups from the carboxyl-epoxide reaction is low whereas the polymerization reaction proceeds without difficulty. For most purposes, it is desirable to employ the solvent in a ratio of the combined three reactants to solvent of from 1:0.4 to 1:1.

Among the monoepoxides suitable for the preparation of ester groups in accordance with this invention are substituted alkyl compounds, as well as ethers and esters. One class of polyhydroxy copolymers results from the reaction of the carboxyl groups of the alpha-beta unsaturated acid, with a saturated hydrocarbon, ether, ester, etc., having a three-membered epoxide ring, said epoxy compound being free of other reactive groups. Examples are oxirane, or ethylene oxide, as well as saturated alkyl oxiranes, for instance, methyl oxirane, or propylene oxide, butene-2-oxide, etc. Among others are esters and ethers containing only one three-membered epoxide substituent, each free of other reactive groups. Examples are phenyl glycidyl ether, isopropyl glycidyl ether, butyl glycidyl ether, glycidyl benzoate, glycidyl acetate, etc.

Valuable alpha-beta unsaturated acids for use in the preparation of the copolymer are short chain alpha-beta unsaturated aliphatic monocarboxylic acids such as acrylic acid, methacrylic acid and crotonic acid. By short chain alpha-beta unsaturated acids are intended those of not more than twelve carbon atoms. Included are half-esters of maleic and fumaric acids formed with saturated alcohols of from one to ten carbon atoms.

Copolymerized with alpha-beta unsaturated acid, or the hydroxy ester of the alpha-beta unsaturated acid, is a monomer copolymerizable therewith, containing a single active $CH_2=C<$ group, including a terminal methylene group, which undergoes addition polymerization to produce linear polymers, in other words, a vinyl compound. Particularly important are vinyl aromatic compounds, for instance, styrene, vinyl toluene, alpha-methyl styrene.

the halostyrenes, etc., having a single vinyl group and free of other substituents capable of reacting with an unsaturated acid, i.e., a monofuncttional vinyl aromatic compound. Also valuable are saturated alcohol esters of acrylic, methacrylic and crotonic acids. Examples of monofunctional vinyl aromatic monomers are isopropenyl toluene, the various dialkyl styrenes, ortho-, meta- and para-chloro styrene, bromo styrenes, fluoro styrenes, cyano styrenes, vinyl naphthalene, the various alpha-substituted styrenes, e.g., alpha-methyl styrenes, alpha-methyl styrenes, as well as various di-, tri- and tetra-chloro, bromo and fluoro styrenes. Acrylic, methacrylic and crotonic esters of saturated alcohols include the methyl, ethyl, propyl, isopropyl, n-butyl, isobutyl, (sec) butyl, (tert)butyl, amyl, hexyl, heptyl octyl, decyl, dodecyl, etc. esters of acrylic, methacrylic, and crotonic acids. Thus, preferred vinyl monomers include alpha-beta unsaturated monocarboxylic acid esters of saturated monohydric alcohols, the acids having not more than four carbon atoms and the alsohols having not more than twenty carbon atoms and monofunctional vinyl aromatic compounds.

Other known vinyl monomers can, of course, be used in the preparation of the carboxyl-containing vinyl copolymer. Desirable monomers include vinyl aliphatic cyanides of not more than four carbon atoms, for example, acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than twenty carbon atoms, for instance, vinyl acetate, vinyl stearate, and the allyl, methallyl, and crotyl esters of propionic, butyric and other acids. Not only the vinyl monomers themselves, but mixtures of the vinyl monomers can be copolymerized with the alpha-beta unsaturated acids to form the carboxyl-containing vinyl copolymer. A particularly desirable mixture is a combination of an acrylic or methacrylic ester with styrene or vinyl toluene.

In the preparation of ester groups any of the catalysts which are activators for epoxide-carboxyl reactions can be used. These epoxy-carboxy catalysts are generally basic materials and are well-known in the art, for example, amines, amine salts, quaternary ammonium hydroxides and quaternary ammonium salts, such as dimethylaminomethyl phenol, benzyl trimethyl ammonium hydroxide, benzyl trimethyl ammonium chloride, etc. Particularly useful for this purpose are the quaternary ammonium hydroxides and halides.

Included among catalysts fro promoting the polymerization of the alpha-beta unsaturated monocarboxylic acid with the vinyl monomer are hydrogen peroxide, various organic peroxides, for example, ascaridol, acetyl and benzoyl peroxide, dibutyryl and dilauryl peroxides, caprylyl peroxide, as well as partially oxidized aldehydes which can contain peroxide, ureaperoxide, succinic acid peroxide, and the like. Other peroxides are fatty acid peroxides, such as coconut oil peroxides, stearic peroxide, lauric peroxide, and oleic peroxide. Also intended are alcoholic peroxides such as tertiary butyl hydroperoxides and other peroxides such as cumene hydroperoxide, tertiary butyl perbenzoate, hydroxyheptyl peroxide and chlorobenzoyl peroxide.

By combining the three reactants according to this invention a wide variety of polyhydroxy copolymers can be prepared depending entirely upon the ratio of vinyl monomer to the other two reactants. Polyhydroxy copolymers particularly useful in the coatings field are generally prepared so that the polyhydroxy copolymer contains from five to seventy-five per cent by weight, based on the copolymer of the hydroxy ester of the alpha-beta unsaturated monocarboxylic acid. Hence, the remaining ninety-five to twenty-five percent of the copolymer is vinyl compound. The maximum amount of monoepoxide will, of course, be that equivalent to the unsaturated monocarboxylic acid, a slight excess being used in the case of low boiling monoepoxides, say those boiling below 60° C. to 80° C. In general, copolymers have an average of from four to one hundred hydroxyl groups per molecule, and weights per hydroxyl group of not less than 116. It has been noted that in the incorporation of the polyhydroxy copolymers a solvent is employed as the reaction medium. Desirable solvents for this purpose are ketones and Cellosolves, as well as aromatic hydrocarbons in combination with a ketone or Cellosolve, for example, acetone, methyl ethyl ketone, methyl isobutyl ketone, diisobutyl ketone, Cellosolve, Cellosolve acetate, and mixtures of ketones and Cellosolves with xylene, toluene, benzene, etc.

For a further understanding of the invention, reference is made to the following specific examples, the viscosities given being Gardner-Holdt viscosities run at 25° C. These examples are intended to be illustrative of the invention only, since different embodiments can be made without departing from this invention.

Example 1

A polyhydroxy containing copolymer is prepared by charging into a two liter flask equipped with an agitator, thermometer and reflux condenser, 535.0 grams of methyl isobutyl ketone. To this solvent is added 178.5 grams of propylene oxide, 221.6 grams of acrylic acid and 400.0 grams of styrene. The ratio of the thre reactants to solvent used is 1.0 to 0.67. In addition to the 178.5 grams of propylene oxide, a 10 percent (17.9 grams) excess is used to compensate for any loss due to volatility; the unreacted portion being distilled off at the completion of the process. To this mixture, as catalysts, are added 16.0 grams of benzoyl peroxide and 22.9 grams of a 35 percent solution of benzyl trimethyl ammonium hydroxide in methanol. The contents of the flask are heated to reflux temperature (75–80° C) at which time an exothermic reaction occurs and heating is discontinued. After the exotherm subsides, heat is again applied to maintain refluxing until an acid value of 2.7 is reached (approximately ten hours). The flask contents are further heated to about 117° C. while distilling off any unreacted propylene oxide. After removal of the excess propylene oxide, the reaction mixture is cooled to about 70° C. and poured into a suitable container. This process results in a 50–50 copolymer of styrene and hydroxy propyl acrylate by combination of these proportions; 22.3 parts by weight of propylene oxide, 27.7 parts by weight of acrylic acid and 50.0 parts by weight of styrene, a total of 100 parts for the three reactants. The copolymer solution thus prepared has a viscosity of Z (Gardner-Holdt) and a 58.5 percent solids content (two hours at 150° C.).

Example 2

A polyhydroxy-containing copolymer is prepared according to Example 1 by combining 44.4 grams (11.1 parts by weight) of propylene oxide, 55.6 grams (13.9 parts by weight) of acrylic acid, and 300.0 grams (75.0 parts by weight) of styrene (parts by weight based on a total of 100 for the three reactants). 266.6 grams of xylene are used as a solvent. The ratio of the three reactants to solvent used is 1 to 0.67. As catalysts are added 4.0 grams of benzoyl peroxide and 5.7 grams of a 35 percent solution of benzyl trimethyl ammonium hydroxide in methanol. Refluxing of the mixture is continued until an acid value of 1.5 is reached (approximately 12½ hours). The 75–25 styrene-hydroxypropyl acrylate copolymer solution prepared has a solids content of 51.3 percent (two hours at 150° C.).

Example 3

A polyhydroxy-containing copolymer is prepared according to Example 1 by combining 62.0 grams (15.5 parts by weight) of propylene oxide, 78.0 grams (19.5 parts by weight) of acrylic acid and 260.0 grams (65.0 parts by weight) of styrene (parts by weight being based on a total of 100 for the three reactants). As solvents are used 200.0 grams of xylene and 66.6 grams of methyl isobutyl ketone. The ratio of the three reactants to solvents used is 1 to 0.67. Four grams of benzoyl peroxide and 8.0 grams of a 35 percent solution of benzyl trimethyl ammonium hydroxide in methanol are added as catalysts. The reaction mixture is refluxed until an acid value of less than one is reached (approximately fourteen hours). The 65–35 styrene-hydroxypropyl acrylate copolymer solution resulting from the combination of the proportions above has a solids content of 52.5 percent (two hours at 150° C.).

*Example 4*

A polyhydroxy-containing copolymer is prepared according to Example 1 by combining 66.9 grams (22.3 parts by weight) of propylene oxide, 83.1 grams (27.7 parts by weight) of acrylic acid, 75.0 grams (25 parts by weight) of styrene and 75.0 grams (25 parts by weight) of methyl acrylate (parts by weight being based on a total of 100 parts for the four reactants), in the presence of 300.0 grams of xylene. The ratio of the four reactants to solvent used is one to one. To this mixture are added as catalysts three grams of benzoyl peroxide and 8.6 grams of a 35 percent solution of benzyl trimethyl ammonium hydroxide in methanol. In addition to the 66.9 grams of propylene oxide, a ten percent excess (6.7 grams) additional are used to compensate for any loss due to volatility; the unreacted portion being distilled off at the completion of the process. The reaction mixture is heated to reflux temperature at which time an exothermic reaction takes place and heating is discontinued. After the exotherm subsides, heat is again applied and refluxing is continued until an acid value of 3.7 is reached (approximately eleven hours). Unreacted propylene oxide is distilled off, the contents of the flask are cooled to around 70° C. and are then poured into a suitable container. This styrene-methyl acrylate-hydroxy propyl acrylate copolymer solution (25–25–50), prepared from the proportions above, has a solids content of 43.1 percent (two hours at 150° C.).

*Example 5*

According to the procedure outlined in Example 1, a polyhydroxy-containing copolymer is prepared from 66.9 grams (22.3 parts by weight) of propylene oxide, 83.1 grams (27.7 parts by weight) of acrylic acid and 150.0 grams (50.0 parts by weight) of vinyl toluene (parts by weight being based on a total of 100 parts for the three reactants). As solvent 200.0 grams of xylene are added. The ratio of the three reactants to solvent used is one to 0.67. To this mixture are added as catalysts, 6.0 grams of benzoyl peroxide and 8.6 grams of a 35 percent solution of benzyl trimethyl ammonium hydroxide in methanol. In addition to the 66.9 grams of propylene oxide, 6.7 grams (ten percent excess) are added to allow for any loss due to volatility; the unreacted portion being distilled off at the completion of the process. The reaction mixture is refluxed until an acid value of 1.2 is obtained (approximately 10½ hours). The 50–50 vinyl toluene-hydroxypropyl acrylate copolymer solution thus prepared has a solids content of 46.2 percent (two hours at 150° C.).

*Example 6*

A polyhydroxy-containing copolymer is prepared according to Example 5 by combining in the presence of 100.0 grams of xylene and 100.0 grams of ethyl Cellosolve, 65.3 grams (22.3 parts by weight) of proylene oxide, 81.0 grams (27.7 parts by weight) of acrylic acid and 146.4 grams (50.0 parts by weight) of vinyl toluene (parts by weight being based on a total of 100 parts for the three reactants). The ratio of reactants to solvent used is one to 0.67. Benzoyl peroxide in the amount of 6.0 grams and triethanolamine in the amount of 18.0 grams are added as catalysts. The 50–50 vinyl toluene-hrydroxypropyl acrylate copolymer solution resulting from the proportions above has an acid value of 3.7 (approximately ten hours refluxing), and a solids content of 43.9 percent (two hours at 150° C.).

*Example 7*

As outlined in Example 5, a polyhydroxy-containing copolymer is prepared by combining 174.2 grams (22.3 parts by weight) of propylene oxide, 216.0 grams (27.7 parts by weight) of acrylic acid and 390.4 grams (50.0 parts by weight) of vinyl toluene (parts by weight being based on a total of 100 parts for the three reactants). As solvents are used 320.0 grams of xylene, and 213.0 grams of methyl isobutyl ketone, the ratio of the three reactants to solvents used being one to 0.68. Sixteen grams of benzoyl peroxide and 16.3 grams of a 60 percent aqueous solution of benzyl trimethyl ammonium chloride are added as catalysts. The 50–50 vinyl toluene-hydroxypropyl acrylate copolymer solution thus prepared by refluxing until an acid value of 0.59 is reached (approximately 9½ hours) has a solids content of 60.3 percent (two hours at 150° C.).

*Example 8*

A polyhydroxy-containing copolymer is prepared according to Example 1, by combining in the presence of 267.0 grams of methyl isobutyl ketone, 80.4 grams (20.1 parts by weight) of propylene oxide, 119.6 grams (29.9 parts by weight) of methacrylic acid, and 200.0 grams (50.0 parts by weight) of vinyl toluene (parts by weight being based on a total of 100 parts for the three reactants). The ratio of the three reactants to solvent used is one to 0.67. To this mixture are added as catalysts, 8.0 grams of benzoyl peroxide and 6.7 grams of a 60 percent aqueous solution of benzyl trimethyl ammonium chloride. Combination of the proportions above result in a 50–50 vinyl toluene-hydroxypropyl methacrylate copolymer solution with an acid value of 9.6 (after approximately 8½ hours refluxing) and a solids content of 56.7 percent (two hours at 150° C.).

*Example 9*

According to the process outlined in Example 1, a polyhydroxy-containing copolymer is prepared in the presence of 200.0 grams of methyl isobutyl ketone by combining 112.2 grams (37.4 parts by weight) of butyl hydrogen maleate, 37.8 grams (12.6 parts by weight) of propylene oxide, and 150.0 grams (50.0 parts by weight) of methyl acrylate (parts by weight being based on a total of 100 parts for the three reactants). The ratio of the three reactants to solvent used is one to 0.67. Six grams of benzoyl peroxide and 2.5 grams of a 60 percent aqueous solution of benzyl trimethyl ammonium chloride are used as catalysts. The copolymer resulting from the combination of the proportions above is a 50–50 methyl acrylate-hydroxypropyl butyl maleate copolymer solution with an acid value of 12.9 (refluxing for approximately ten hours) and a solids content of 40.7 percent (two hours at 150° C.).

*Example 10*

According to the procedure outlined in Example 1, a polyhydroxy-containing copolymer is prepared by combining in the presence of 200.0 grams of methyl isobutyl ketone, 101.4 grams (33.8 parts by weight) of phenyl glycidyl ether (weight per epoxide=150), 48.6 grams (16.2 parts by weight) of acrylic acid, and 150.0 grams (50.0 parts by weight) of styrene (parts by weight being based on a total of 100 parts for the three reactants). The ratio of the three reactants to solvent used is one to 0.67. As catalysts, 6.0 grams of benzoyl peroxide and 5.0 grams of a 60 percent aqueous solution of benzyl trimethyl ammonium chloride are added. The mixture is refluxed until an acid value of 3.4 is reached (approximately eight hours). The above proportions result in a 50–50 styrene-acrylic acid ester of phenyl glycidyl ether copolymer solution, with a solids content of 55 percent (two hours at 150° C.).

*Example 11*

A polyhydroxy-containing copolymer is prepared by combining in a one liter flask fitted with a thermometer, condenser and agitator, in the presence of 200 grams of methyl isobutyl ketone; 97.5 grams (32.5 parts by weight) of butyl glycidyl ether (weight per epoxide=133), 52.5 grams (17.5 parts by weight) of acrylic acid and 150.0 grams (50.0 parts by weight) of vinyl toluene (parts by weight being based on a total of 100 parts for the three reactants). The ratio of the three reactants to solvents used is one to 0.67. As catalysts are added six grams of benzoyl peroxide and five grams of a 60 percent aqueous solution of benzyl trimethyl ammonium chloride. The mixture is heated to reflux temperature, at which time an exothermic reaction occurs and heating is discontinued. After the exotherm subsides, heat is again applied and refluxing is maintained until an acid value of 3.8 is reached (approximately 5½ hours). The 50–50 vinyl toluene-acrylic acid ester of butyl glycidyl ether copolymer solution prepared from the proportions above has a solids content of 60 percent (two hours at 150° C.).

It will thus be apparent that a new and improved process has been provided for the preparation of hydroxyesters of copolymers of vinyl monomers and alpha-beta unsaturated monocarboxylic acids. It is also seen that a new class of polyhydroxy copolymers is prepared by the single step process of this invention. The use of two catalysts to provide a single step process is not only of economic importance but is significant in view of the fact that the epoxy-carboxy catalysts are inhibitors of vinyl copolymerization reactions. Moreover, in addition to economic superiority, there are also other advantages to carrying out the preparation of hydroxyl-containing copolymers in accordance with this invention. In the two step process esterification with monoepoxide is difficult if the unsaturated acid and vinyl compound are copolymerized prior to reaction with monoepoxide. On the other hand, if the hydroxy copolymer is made by reacting the unsaturated acid with monoepoxide prior to copolymerization with, say, styrene, other difficulties are encountered. The acrylic or other acid must be heated to bring about its reaction with the monoepoxide. This increases the tendency of the unsaturated acid to homopolymerize. In order to prevent polymerization of acrylic acid, an inhibitor is generally added prior to esterification. This, of course, means that more polymerization catalyst must be used when the acrylic acid is subsequently reacted with, for example, styrene, and in addition percent conversion and molecular weight in many cases are reduced. A further disadvantage of the two step process is that the intermediate product, that is, the ester of acrylic acid, must be used immediately in the preparation of the final product, or it must be further inhibited if it is stored.

While the invention specifically is directed to a one step process it is obvious that variations will occur to those skilled in the art, given the teachings of this invention. Thus, while polyhydroxy copolymers have been disclosed it is quite clear that polyhydroxypolycarboxy copolymers can be prepared by the process of this invention, i.e., by using less monoepoxide than an amount equivalent to carboxyl groups. Moreover, while the invention has been specifically described with reference to vinyl aromatic compounds, it is not limited to the use of such compounds. The process can be readily carried out with a variety of vinyl monomers, as well as monoepoxides and unsaturated acids. It is further understood that different modes of applying principles of the invention can be employed. For example, the solvent can be brought to reaction temperature prior to addition of other reactants. That is, the monomer-catalyst mixture can be added to solvent which has been pre-heated to the reaction temperature. Further, means other than acid value and solids content determinations can be used in ascertaining when the esterification and polymerization reactions are substantially complete. Such modifications are within the scope of this invention.

What is claimed is:

1. A one-step process for preparing a polyhydroxy copolymer from (*a*) an unsaturated aliphatic acid having only one carboxyl group and selected from the group consisting of acrylic acid, methacrylic acid, crotonic acid and half acid-esters of maleic and fumaric acids formed with saturated alcohols of from 1 to 10 carbon atoms, (*b*) an ethylenically unsaturated monomer copolymerizable with the unsaturated acid and selected from the group consisting of monovinyl aromatic hydrocarbons, monovinyl halogenated aromatic hydrocarbons, vinyl alkyl ethers having not more than twenty carbon atoms in the alkyl group, alkenyl cyanides of not over four carbon atoms, monoethylenically unsaturated monocarboxylic acid esters of saturated monohydric alcohols, the acids having not more than four carbon atoms and the alcohols having not more than twenty carbon atoms, and monoethylenically unsaturated monohydric alcohol esters of saturated monocarboxylic acids, the alcohols having not more than four carbon atoms and the acids having not more than twenty carbon atoms, and (*c*) a monoepoxide selected from the group consisting of 1,2-alkylene oxides, aryl-1,2-alkylene oxides, monoglycidyl ethers and monoglycidyl esters each having not over ten carbon atoms; which one step process comprises in a non-reactive solvent in an amount sufficient to substantially completely dissolve the resulting polyhydroxy copolymer, and in the presence of both a free radical producing peroxide vinyl polymerization catalyst and an epoxycarboxy catalyst selected from the group consisting of amines and quaternary ammonium compounds reacting the unsaturated aliphatic acid with the monoepoxide while concomitantly copolymerizing the unsaturated aliphatic acid with the ethylenically unsaturated monomer, catalyzing the esterification reaction with 0.5 to 6 weight percent based on the reactants of the epoxycarboxy catalyst and catalyzing the concomitant copolymerization reaction with 1 to 4 weight percent based on the reactants of the peroxide catalyst, the catalyst amounts within said ranges being such that each reaction is initiated at the reaction temperaure by the catalyst employed, and maintaining a reaction temperature of 60° C. to the reflux temperature of the system until an acid value in the range of 13 to 0 is obtained and the concomitant polymerization reaction is substantially complete, the unsaturated acid and ethylenically unsaturated monomer being employed in amounts such that the resulting copolymer contains 5 to 75 weight percent hydroxy ester and 25 to 95 percent ethylenically unsaturated monomer.

2. The process of claim 1 wherein (*a*) is methacrylic acid, wherein (*b*) is a monoethylenically unsaturated monocarboxylic acid ester of a saturated monohydric alcohol, the acid having not more than four carbon atoms and the alcohol having not more than twenty carbon atoms, wherein (*c*) is propylene oxide and wherein the non-reactive solvent is an aromatic hydrocarbon.

3. The process of claim 1 wherein the epoxy-carboxy catalyst is a quaternary ammonium halide.

4. The process of claim 1 wherein (*a*) is methacrylic acid, wherein (*b*) is a monovinyl aromatic hydrocarbon, wherein (*c*) is propylene oxide, wherein the polymerization catalyst is an organic peroxide, and wherein the epoxy-carboxy catalyst is a tertiary amine.

5. The process of claim 1 wherein (*a*) is acrylic acid, wherein (*b*) is a monovinyl aromatic hydrocarbon, wherein (*c*) is propylene oxide, wherein the polymerization catalyst is an organic peroxide, and wherein the epoxy-carboxy catalyst is a quaternary ammonium compound.

References Cited in the file of this patent

UNITED STATES PATENTS

| | | |
|---|---|---|
| 2,484,487 | Caldwell | Oct. 11, 1949 |
| 2,530,983 | Minter | Nov. 21, 1950 |
| 2,604,464 | Segall et al. | July 22, 1952 |
| 2,607,761 | Seymour | Aug. 19, 1952 |
| 2,729,615 | Bloom et al. | Jan. 3, 1956 |
| 2,740,765 | Parker | Apr. 3, 1956 |
| 2,765,296 | Strain | Oct. 2, 1956 |
| 2,842,519 | Ripley-Duggan | May 24, 1958 |